Aug. 26, 1924.

S. M. DONALS

TOOTH CLEANSING DEVICE

Filed Oct. 1, 1923

1,506,417

Inventor
Stanley M. Donals
By Lancaster Allwine
Attorneys

Patented Aug. 26, 1924.

1,506,417

UNITED STATES PATENT OFFICE.

STANLEY M. DONALS, OF ROCHESTER, NEW YORK.

TOOTH-CLEANSING DEVICE.

Application filed October 1, 1923. Serial No. 666,004.

*To all whom it may concern:*

Be it known that I, STANLEY M. DONALS, a citizen of the United States, residing at Rochester, in the county of Monroe and State of New York, have invented certain new and useful Improvements in a Tooth-Cleansing Device, of which the following is a specification.

This invention relates to improvements in tooth cleansing devices.

The primary object of this invention is the provision of a tooth brush having detachable handle and brush head parts, by means of which it is able to utilize the handle independent of a particular brush head.

A further object of this invention is the provision of a tooth cleansing device which embodies a handle and a plurality of different forms of tooth cleaning members which may be detachably associated therewith.

A further object of this invention is the provision of a tooth cleaning device, which embodies a handle, and a tooth cleaning member detachably related therewith so that it is possible to place and remove the tooth cleaning member with respect to the handle in a sanitary and convenient manner.

A further object of this invention is the provision of a tooth cleaning device which embodies a handle and a tooth cleaning portion laterally offset at a fixed angle with respect to the axis of the handle.

A further object of this invention is the provision of a novel dental floss holding bow.

Other objects and advantages of this invention will be apparent during the course of the following detailed description.

In the accompanying drawing, forming a part of this specification, and wherein similar reference characters designate corresponding parts throughout the several views.

Figure 1:
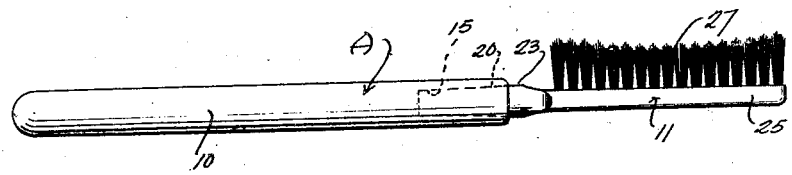
Figure 1 is a side elevation of the improved tooth brush, showing the handle and brush head parts thereof in a connected relation.
Figure 2:
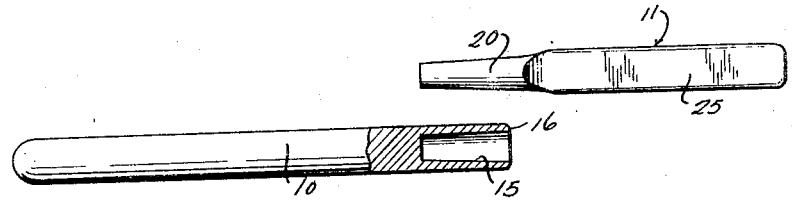
Fig. 2 is a bottom plan view, partly in cross section, showing the novel means of detachably connecting a brush head with a handle; the brush head and handle being shown in an adjacent non-connected relation.

In the drawing, wherein for the purpose of illustration is shown but the preferred embodiment of this invention, the letter A may generally designate the improved tooth cleaning device, which may include a handle 10, and brush head 11 and dental floss holding bow 12 which may be interchangeably used with the handle 10.

The handle portion 10 may be formed of any approved material, such as celluloid, hard rubber, ivory, or the like, preferably being straight. At its forward end it is preferably provided with a bore 15, which tapers with a diminishing diameter inwardly from the forward end 16, substantially as is illustrated in the drawing.

Figure 3:
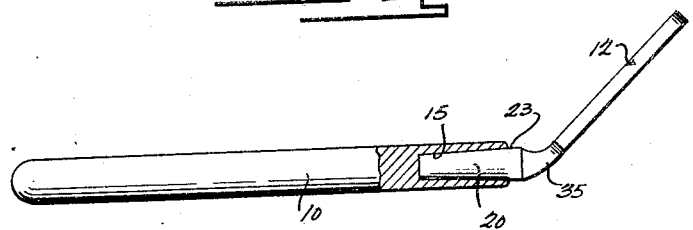
Fig. 3 is a plan view, partly in cross section, showing the improved tooth cleaning device when the handle part thereof is used for supporting a dental floss holding bow.

The brush head 11 and the dental floss bow 12 have one novel feature in common, namely, the provision of the attaching shank 20, which is preferably of solid tapering formation. This tapering attaching shank 20 is preferably formed upon a straight axis, and is adapted for frictional seating engagement within the socket 15 of the handle 10 in order to maintain the tooth cleaning member in assembled non-movable relation with the handle 10. The tapered attaching shank 20 is of a length greater than the depth of the tapered bore 15, so that as is illustrated in Figures 1 and 3 of the drawing, a certain portion 23 of the shank 20 extends outwardly from the forward end 16 of the handle 10, and affords a means for gripping the tooth cleaning member so that it may be applied or detached with respect to the handle 10, without the necessity of touching the bristles of the brush head 11, or of interfering with the dental floss upon the bow 12. This is not only a convenient construction, but is a very desirable sanitary arrangement, since there is no necessity for handling the bristles or the dental floss upon the tooth cleaning members 11 and 12 respectively when it is desired to attach or detach the tooth cleaning members with respect to the handle 10 upon which they may be assembled.

The tooth brush head 11, except for the attaching shank 20, may be of conventional construction, preferably including the supporting back 25 with which the attaching shank 20 is integrally formed; said back 25 having the bristles 27 connected thereto in any approved arrangement or construction; the bristles 27 only extending to, but not into the attaching shank 20.

Figure 4:
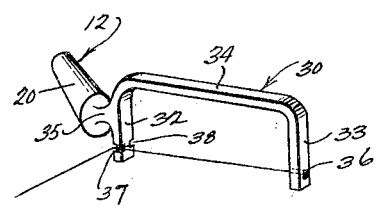
Fig. 4 is a perspective view of the dental floss holding bow.

The dental floss holding bow 12 is of somewhat novel construction, including a substantially U-shaped bow portion proper 30, which includes downwardly extending floss holding fingers 32 and 33 and the connecting or bight portion 34. The shank 20 is connected to the finger 32, at the rear thereof, as by portion 35 which may be considered as part of the attaching shank 20; the shank 20 being so formed in connection with the plane of the bow portion proper 30 that the axis of the attaching shank 20 is disposed at an obtuse angle with respect to the plane of the portion 30, and substantially as is illustrated in Figures 3 and 4 of the drawing. A novel method of attaching floss to the fingers 32 and 33 of the bow is contemplated, which includes a transverse aperture 36 provided in the bow finger 33, and lateral notches 37 and 38 on opposite sides of the finger 32 adjacent its lower free end. The dental floss is preferably knotted at one end, as is illustrated in Figure 4 of the drawings, and the floss threaded through the aperture 36 of finger 33 and wound about the finger 32 in the notches 37 and 38. The end of the floss may then be wound about the user's forefinger or otherwise conveniently held by the person using the brush, and with the same hand which grasps the handle 10, so that the brush A, as used with the handle 10 and the dental floss holding bow 12, may be conveniently and very effectively used for cleansing between the teeth of a person. It is to be noted that the bow 12, which may be considered as disposed in a vertical plane is laterally offset with respect to the axis of the handle 10 and its attaching shank 20, in contra-distinction to a horizontal offset, so that the bow 12 may be most conveniently handled to have access to various teeth of the user.

From the foregoing it can be seen that a tooth brush has been provided which not only affords a sanitary tooth brush, but which is economical in that the brush head and dental floss holding member are interchangeable with respect to the handle with which they may be used. The handle 10 may be used indefinitely, so that it is not necessary to provide a new handle when the tooth cleaning member wears out; as it is contemplated to manufacture the brush heads and dental floss holders with standard sized attaching shanks 20 which may be used in connection with a standard size socket 15 in the handle 10.

Various changes in the shape, size, and arrangement of parts may be made to the form of invention herein shown and described, without departing from the spirit of this invention or the scope of the claims.

I claim:

1. As an article of manufacture a dental floss holding bow comprising a substantially U-shaped structure, and an attaching shank extending longitudinally therefrom and inclined transversely of the bow at an angle of less than 180° with respect to the plane of the U-shaped bow.

2. A dental floss holding bow comprising a U-shaped structure providing floss attaching fingers, and a tapered attaching shank affixed to one of said fingers intermediate the depth thereof and disposed transversely of the bow at an angle of less than 180° with respect to the U-shaped bow.

STANLEY M. DONALS.